US010028246B2

(12) United States Patent
Chiang et al.

(10) Patent No.: US 10,028,246 B2
(45) Date of Patent: Jul. 17, 2018

(54) THREE-DIMENSIONAL FEMTOCELL MAPPING

(71) Applicant: Verizon Patent and Licensing Inc., Arlington, VA (US)

(72) Inventors: David Chiang, Fremont, CA (US); Donna L. Polehn, Kirkland, WA (US); Steven R. Rados, Danville, CA (US); Thomas W. Haynes, Concord, CA (US); Kent W. Hughes, Oakland, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 313 days.

(21) Appl. No.: 14/584,196

(22) Filed: Dec. 29, 2014

(65) Prior Publication Data

US 2016/0192318 A1  Jun. 30, 2016

(51) Int. Cl.
*H04W 64/00* (2009.01)
*H04W 36/32* (2009.01)
*H04W 36/04* (2009.01)
*H04W 36/14* (2009.01)
*H04W 4/02* (2018.01)
*H04W 84/04* (2009.01)
*H04W 88/16* (2009.01)

(52) U.S. Cl.
CPC .......... *H04W 64/003* (2013.01); *H04W 4/02* (2013.01); *H04W 36/04* (2013.01); *H04W 36/14* (2013.01); *H04W 36/32* (2013.01); *H04W 84/045* (2013.01); *H04W 88/16* (2013.01)

(58) Field of Classification Search
CPC ......... H04W 40/20; H04W 4/02; H04W 4/04; H04W 64/003; H04W 84/045; H04W 8/18; H04W 36/32; H04W 88/16

USPC ........................................................ 455/436
See application file for complete search history.

(56) References Cited

U.S. PATENT DOCUMENTS

| | | | | |
|---|---|---|---|---|
| 2010/0120394 | A1* | 5/2010 | Mia ..................... | H04W 64/003 455/404.2 |
| 2011/0093913 | A1* | 4/2011 | Wohlert ............... | H04L 63/101 726/1 |
| 2013/0331100 | A1* | 12/2013 | Jamadagni ........... | H04W 48/16 455/434 |

FOREIGN PATENT DOCUMENTS

EP  3139561 A1 * 3/2017 ............ H04L 29/06

OTHER PUBLICATIONS

3rd Generation Partnership Project ("3GPP"), "Technical Specification Group Services and System Aspects; Architecture Aspects of Home NodeB and Home eNodeB (Release 9)," 3GPP TR 23.830 v9.0.0, Sep. 2009.

(Continued)

*Primary Examiner* — Lester Kincaid
*Assistant Examiner* — Gary Lafontant

(57) ABSTRACT

Femtocells are often used to extend the coverage of wireless telecommunication networks, but do not typically incorporate mechanisms that allow their location to be easily ascertained. As described herein, a system may determine the locations of femtocells, based on the locations of user devices that attach to, detach from, handover between, and/or detect the femtocells. A map (such as a three-dimensional map) may be generated based on the determined locations of femtocells. The locations of femtocells may be used, for example, in emergency broadcast situations, in order to ensure that messages are distributed as completely as possible in a given region.

20 Claims, 11 Drawing Sheets

(56) References Cited

OTHER PUBLICATIONS

3GPP, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 v12.3.0, Sep. 2014.

* cited by examiner

THREE-DIMENSIONAL FEMTOCELL MAPPING

BACKGROUND

Wireless telecommunication networks, such as cellular networks, may provide cellular service via base stations. The coverage offered by base stations may be interrupted or otherwise degraded based on the presence of structures (such as buildings), topography (such as mountains), or other factors. Femtocells may be deployed in areas where cellular coverage is relatively poor. User devices (such as cellular telephones) may connect to the cellular network via femtocells, in order to obtain wireless service.

DETAILED DESCRIPTION OF PREFERRED EMBODIMENTS

The following detailed description refers to the accompanying drawings. The same reference numbers in different drawings may identify the same or similar elements.

Femtocells may augment the coverage of a wireless telecommunications network, by allowing wireless coverage to be provided to areas the ordinarily would not be serviced by the wireless telecommunications network. For example, buildings or terrain may interfere with wireless coverage provided by cells of a wireless telecommunications network, certain areas may be out of range of cells of a wireless telecommunications network, radio frequency ("RF") interference may degrade cell coverage, etc. Femtocells may be deployed by individuals or businesses, and the locations of deployed femtocells may not necessarily be known to an operator of the wireless telecommunications network. It may be beneficial for the locations of femtocells to be known, so that messages or other communications can be sent via particular femtocells.

For example, emergency messages may be relevant to a particular building, city block, or other localized region (e.g., a fire alarm, a flood warning, etc.). Femtocells, that service the localized region, may be used to broadcast emergency messages to user devices (e.g., cellular telephones) within the localized region, thereby increasing the chance that these user devices receive the emergency messages. As another example, the operator of the wireless network may use location information, for a particular femtocell, to determine a billing rate associated with the femtocell. For example, a femtocell in a high rise commercial building may be associated with a higher billing rate (e.g., a monthly subscription for leasing or operating the femtocell), while a femtocell in a rural home may be associated with a lower billing rate. As yet another example, the operator of the wireless network may use location information, for a particular femtocell, to determine whether the particular femtocell is authorized to be operated in a particular location. For instance, a user may be authorized to deploy a femtocell only within the user's home, or certain areas may exist where the use of femtocells is not authorized (e.g., stadiums, government facilities, etc.). Since femtocells typically do not include the capability to determine and/or report location information, it may be difficult or impossible to determine the locations of deployed femtocells.

Figure 1:
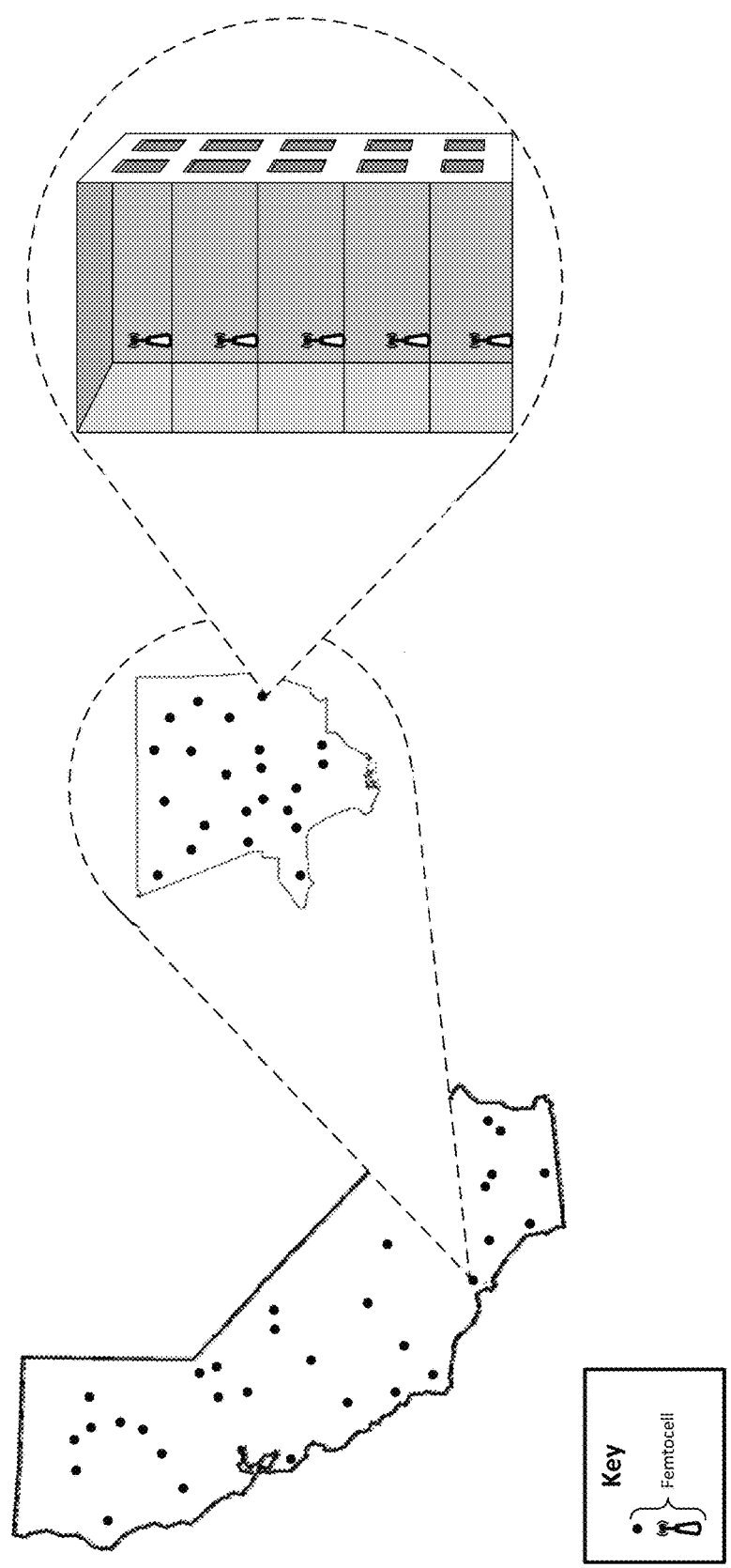
FIG. 1 illustrates an example overview of one or more implementations described herein, in which a map of femtocells may be generated on a relatively large scale and/or a relatively small scale.

Some implementations, described herein, may allow the locations of femtocells to be determined. For example, as described below, location information, signal quality, and/or other information, may be received from user devices, that attach to femtocells (and/or from femtocell gateways, or the femtocells themselves). This information may be aggregated and used to determine the location of femtocells. In some implementations, as shown in FIG. 1, a map may be generated, which shows the locations of femtocells. As shown, the map may have one or more levels of granularity. For instance, femtocells may be displayed on the map on a statewide basis, on a city-wide basis, or an even smaller basis (e.g., femtocells may be mapped within an individual building, street, city block, etc.). As may be apparent from FIG. 1, the mapping of femtocells may be performed in three dimensions. For instance, in addition to latitude and longitude coordinates, the altitude (e.g., height above sea level, floor of a building, etc.) of a femtocell may be determined.

While the term "femtocell" is used herein, similar techniques may apply to "small cells" in general. For instance, techniques described herein may apply to microcells, picocells, nanocells, and/or other types of devices that provide wireless access to a wireless telecommunications network.

Figure 2:
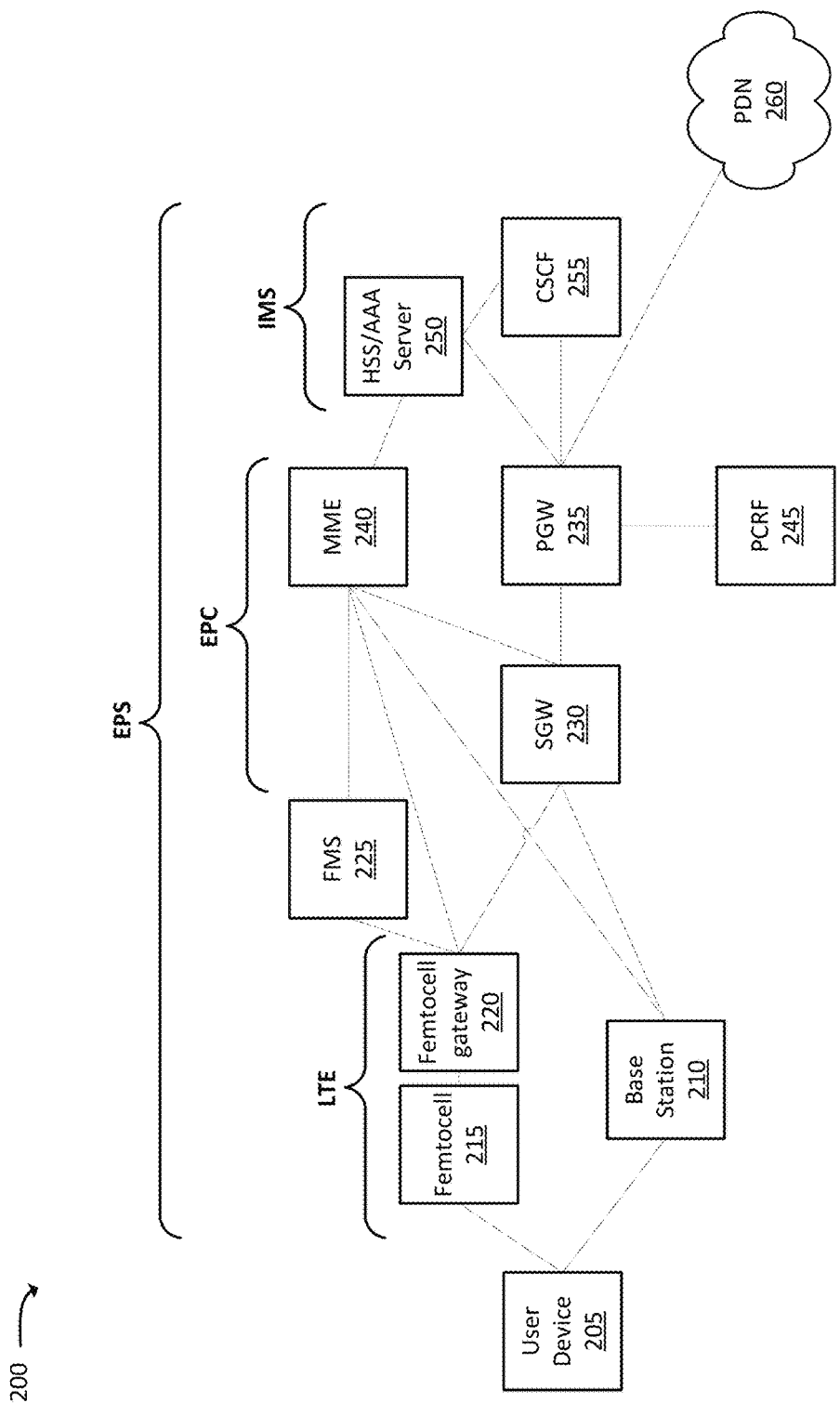
FIG. 2 illustrates an example environment, in which systems and/or methods, described herein, may be implemented.

FIG. 2 illustrates example environment 200, respectively, in which systems and/or methods described herein may be implemented. As shown in FIG. 2, environment 200 may include user device 205, base station 210, femtocell 215, femtocell gateway 220, FMS 225, serving gateway ("SGW") 230, packet data network ("PDN") gateway ("PGW") 235, mobility management entity device ("MME") 240, policy and charging rules function ("PCRF") 245, home subscriber server ("HSS")/authentication, authorization, accounting ("AAA") server 250 (hereinafter referred to as "HSS/AAA server 250"), and PDN 260.

Environment 200 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 210, some or all of which may take the form of an evolved node B ("eNB"), via which user device 205 may communicate with the EPC network. The EPC network may include one or more SGWs 230, PGWs 235, and/or MMEs 240, and may enable user device 205 to communicate with PDN 260 and/or an Internet protocol ("IP") multimedia subsystem ("IMS") core network. The IMS core network may include HSS/AAA server 250, and may manage authentication, session initiation, account information, a user profile, etc., associated with user device 205.

User device 205 may include a computation and communication device, such as a wireless mobile communication device that is capable of communicating with base station 210, femtocell 215, and/or PDN 260. For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 205 may send traffic to and/or receive traffic from PDN 260 via base station 210, femtocell 215, femtocell gateway 220, SGW 230, and/or PGW 235.

Base station 210 may include one or more network devices that receive, process, and/or transmit traffic, such as calls, audio, video, text, and/or other data, destined for and/or received from user device 205. In one example, base station 210 may be an eNB device and may be part of the LTE network. Base station 210 may receive traffic from and/or send traffic to user device 205 via SGW 230, PGW 235, and/or PDN 260. Base station 210 may send traffic to and/or receive traffic from user device 205 via, for example, an air interface (e.g., a cellular air interface).

Femtocell 215 may also include one or more network devices that receive process, and/or transmit traffic, such as calls, audio, video, text, and/or other data, destined for and/or received from user device 205. In one example, femtocell 215 may include a portable device that may be deployed (e.g., physically placed and/or installed) by an end user (e.g., an individual or business that is separate from an entity that owns and/or operates the LTE network). Femtocell 215 may be directly communicatively coupled to MME 240, and/or maybe indirectly coupled to SGW 230 and/or MME 240 (e.g., via femtocell gateway 220). Femtocell 215 (and/or femtocell gateway 220) may, in some implementations, be communicatively coupled to SGW 230 and/or MME 240 via PDN 260.

Femtocell 215 may generally provide connectivity, to the LTE network, in locations where LTE coverage (e.g., as provided by one or more base stations 210) is poor or is non-existent. For example, a customer may place femtocell 215 in an office building, in which LTE coverage is poor, or in a rural residence, in which LTE coverage is non-existent. As mentioned above, the term "femtocell," as used herein, may refer to a small cell that provides connectivity to a wireless telecommunications network. The coverage area, associated with femtocell 215, may be smaller than the coverage area associated with base station 210. For instance, base station 210 may have a range of up to 35 kilometers, while femtocell 215 may have a range of 200 meters, 10 meters, or some other range. In 3GPP terminology, a femtocell may be a Home Node B ("HNB") or a Home eNB ("HeNB").

Femtocell gateway 220 may include one or more network devices, via which one or more femtocells 215 may be communicatively coupled to MME 240 and/or to SGW 230. For example, femtocell gateway 220 may include one set of interfaces to communicate with SGW 230 and/or MME 240, and another set of interfaces (e.g., interfaces of a different type) to communicate with one or more femtocells 215. Femtocell gateway 220 may aggregate control information (e.g., identifiers of femtocells 215 to which user devices 205 are connected, identifiers of user devices 205 that are connected to femtocells 215, handover/hand-in/hand-out instructions, etc.) from multiple femtocells 215, and may report the information to FMS 225 and/or MME 240. Additionally, or alternatively, femtocell gateway 220 may aggregate user plane data (e.g., substantive traffic, such as call traffic, audio/video streaming traffic, web traffic, etc.) and/or user plane data to and/or from multiple femtocells 215.

FMS 225 may include one or more devices that generate a map (e.g., a three-dimensional map) of femtocells 215. As described below, FMS 225 may generate the map based on location information received from one or more user devices 205, control information received from femtocell 215 and/or femtocell gateway 220, information received from MME 240, and/or other information. In some implementations, FMS 225 may be implemented as a standalone device that is separate from femtocell gateway 220 and MME 240. In other implementations, some or all of the functionality, associated with FMS 225, may be integrated within femtocell gateway 220, MME 240, and/or another device. FMS 225 may include a hardware interface, such as wired and/or wireless circuitry that enables FMS 225 to communicate with user device 205, femtocell 215, femtocell gateway 220, MME 240, and/or other devices.

SGW 230 may include one or more network devices that gather, process, search, store, and/or provide information in a manner described herein. SGW 230 may, for example, aggregate traffic received from one or more base stations 210, femtocells 215, and/or femtocell gateways 220, and may send the aggregated traffic to PDN 260 via PGW 235.

PGW 235 may include one or more network devices that gather, process, search, store, and/or provide information in a manner described herein. PGW 235 may aggregate traffic received from one or more SGWs 230, etc. and may send the aggregated traffic to PDN 260. PGW 235 may also, or alternatively, receive traffic from PDN 260 and may send the traffic toward user device 205 via base station 210, femtocell 215, femtocell gateway 220, and/or SGW 230.

MME 240 may include one or more computation and communication devices that perform operations to register user device 205 with the EPS, to establish bearer channels associated with a session with user device 205, to hand off user device 205 from the EPS to another network, to hand off user device 205 from the other network to the EPS, and/or to perform other operations. MME 240 may perform policing operations on traffic destined for and/or received from user device 205.

PCRF 245 may include one or more devices that aggregate information to and from the EPC network and/or other sources. PCRF 245 may receive information regarding policies and/or subscriptions from one or more sources, such as subscriber databases and/or from one or more users (such as, for example, an administrator associated with PCRF 245).

HSS/AAA server 250 may include one or more devices that manage, update, and/or store, in a memory associated with HSS/AAA server 250, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber (e.g., a subscriber associated with user device 205); information regarding services to which particular subscribers are subscribed (e.g., communication services, such as video conferencing services, voice chat services, etc.); and/or other information. Additionally, or alternatively, HSS/AAA server 250 may perform authentication, authorization, and/or accounting operations associated with the subscriber and/or a communication session with user device 205.

CSCF 255 may perform session control, authentication, and/or other functions associated with IMS services, on behalf of user device 205. In some implementations, CSCF may include multiple components, such as a proxy-CSCF ("P-CSCF"), a serving-CSCF ("S-CSCF"), and/or an interrogating-CSCF ("I-CSCF"). The S-CSCF may maintain correlations between user device 205 IP addresses and Session Initiation Protocol ("SIP") addresses, determine application servers to which traffic should be forwarded, provide routing services, and/or perform other functions. The I-CSCF may serve as a forwarding point for outside traffic to the IMS core network and/or to the S-CSCF, and may have a published IP address (e.g., the IP address may be registered with a Domain Name System ("DNS") server). The P-CSCF may serve as an SIP proxy that may aid I n the initial registration of user device 205 with the IMS core network.

PDN 260 may include one or more wired and/or wireless networks. For example, PDN 260 may include an Internet Protocol ("IP")-based PDN, a wide area network ("WAN") such as the Internet, a core network of a telecommunications provider, a private enterprise network, and/or one or more other networks. User device 205 may connect, through PGW 235, to data servers, application servers, other user devices 205, and/or to other servers or applications that are coupled to PDN 260. PDN 260 may be connected to one or more other networks, such as a public switched telephone network ("PSTN"), a public land mobile network ("PLMN"), and/or another network. While "direct" connections are shown in FIG. 2 between certain devices, some devices may communicate with each other via PDN 260. For example, FMS 225 may communicate with femtocell gateway 220 and/or MME 240 indirectly, such as via PDN 260 and/or another network.

Figure 3:
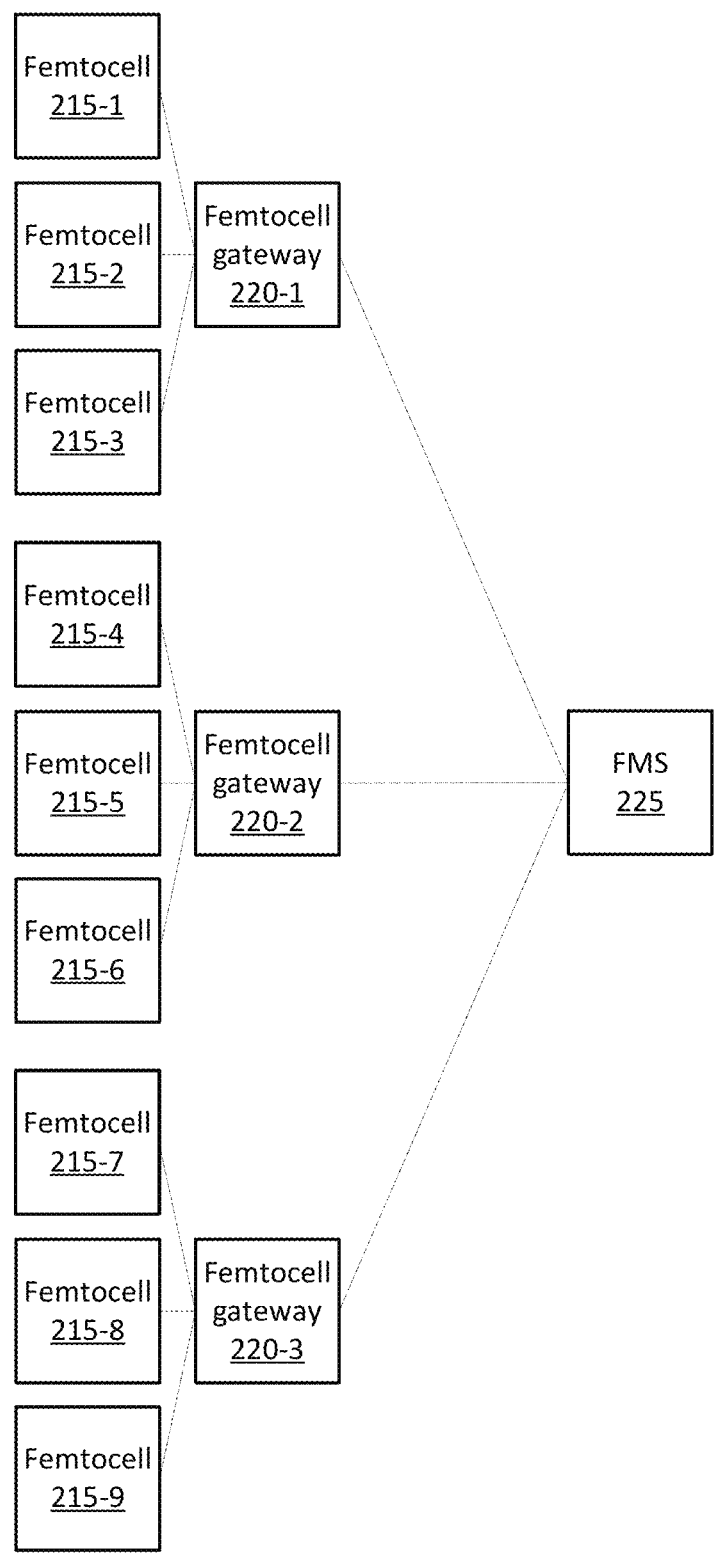
FIGS. 3-5 illustrate example arrangements of devices shown in FIG. 2, in accordance with some implementations.
Figure 4:
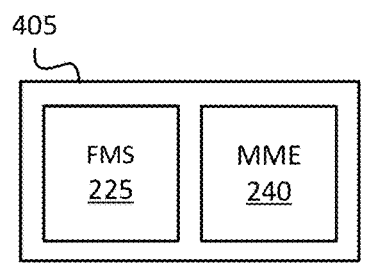
Figure 5:
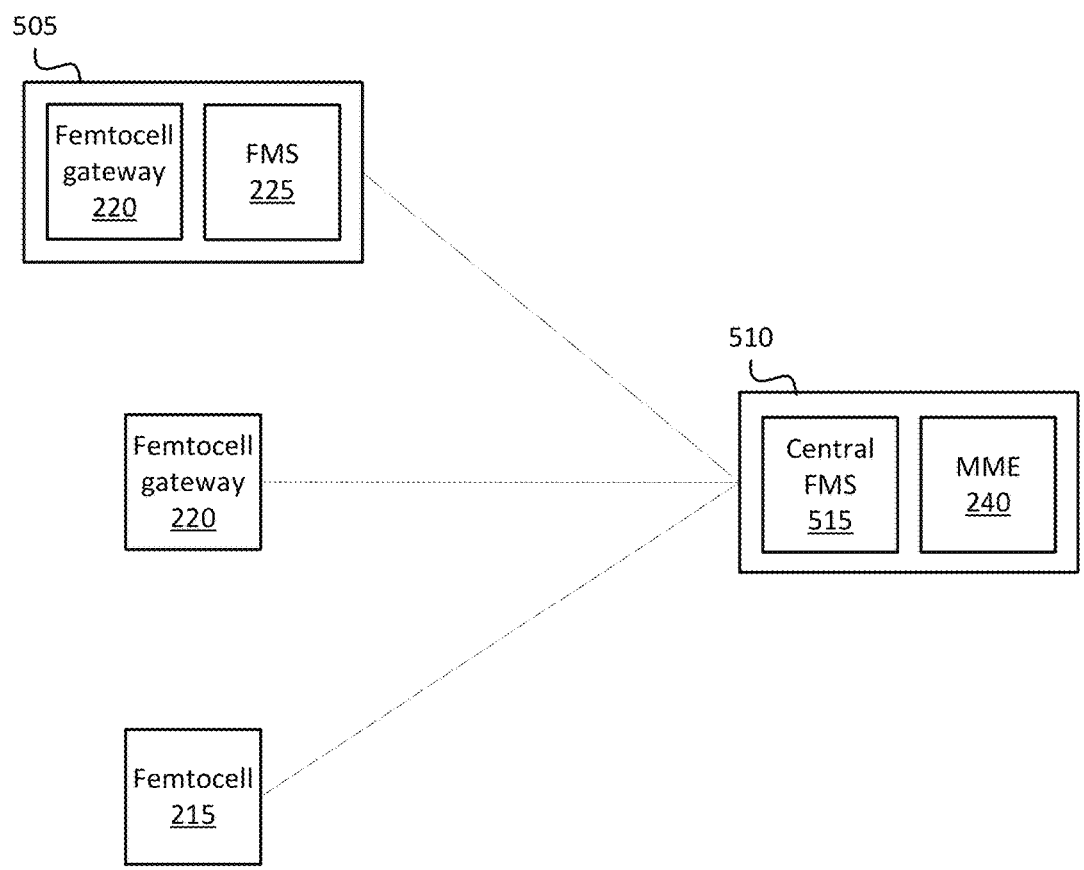

FIGS. 3-5 illustrate example arrangements of devices shown in FIG. 2, in accordance with some implementations. For example, FIG. 3 illustrates an example arrangement, in which multiple femtocells 215 may be associated with one femtocell gateway 220 (e.g., a many-to-one relationship), and multiple femtocell gateways 220 may be associated with one FMS 225. As shown, for instance, femtocells 215-1 through 215-3 may be associated with femtocell gateway 220-1, femtocells 215-4 through 215-6 may be associated with femtocell gateway 220-2, and femtocells 215-7 through 215-9 may be associated with femtocell gateway 220-3. Such an arrangement may be in place in situations where different users deploy femtocells 215 and femtocell gateways 220, when femtocells are located in different buildings (e.g., femtocells 215-1 through 215-3 may be deployed in one building, while femtocells 215-4 through 215-6 are deployed in another building), etc. Femtocell gateways 220-1 through 220-3 may aggregate information (e.g., information regarding attachments, detachments, handovers, etc. of user devices) from respective femtocells 215, and may provide the information to FMS 225. In this sense, FMS 225 may ultimately aggregate information from femtocells 215-1 through 215-9, via femtocell gateways 220-1 through 220-3.

FIG. 4 illustrates an example implementation, in which FMS 225 and MME 240 are integrated in a single device. For example, as shown, device 405 may include FMS 225 and MME 240. Device 405 may be a part of the EPC network, as shown in FIG. 2, and may include functionality associated with a standard MME 240, functionality associated with FMS 225 (as described herein), and/or other functionality.

FIG. 5 illustrates another example arrangement, in accordance with some implementations. For instance, as shown in FIG. 5, device 505 may include femtocell gateway 220 and FMS 225, and device 510 may include central FMS 515 and MME 240. FMS 225, included in device 505, may receive information from femtocell gateway 220 via an internal communication mechanism (e.g., a software or hardware interface within device 505). Central FMS 515, included in device 510, may receive information from one or more sources, such as device 505, femtocell gateway 220 (e.g., a femtocell gateway that is not included in device 505), and femtocell 215. Femtocell 215 may, for instance, be configured to communicate directly with device 510 (e.g., not via femtocell gateway 220). Thus, femtocell 215 may provide information, to device 510, regarding attachments, detachments, handovers, etc., that are associated with femtocell 215.

Central FMS 515 may be a "central" FMS, in that central FMS 515 may receive information from one or more FMSs 225. For instance, FMSs 225 may be deployed in a hierarchical manner, such as in the example implementation shown in FIG. 5. While FIG. 5 shows a particular example, other variations are possible, in practice. For example, while device 510 is shown as including central FMS 515 and MME 240, in other implementations, central FMS 515 and MME 240 may not be integrated within a single device. Further, while a hierarchical arrangement of FMSs 225 is discussed in connection with FIG. 5, in other implementations, a hierarchical arrangement may not be used. As yet another example, hierarchical arrangements of FMSs 225 may be used in implementations where femtocell gateway 220 and FMS 225 are not integrated in a single device.

Figure 6:
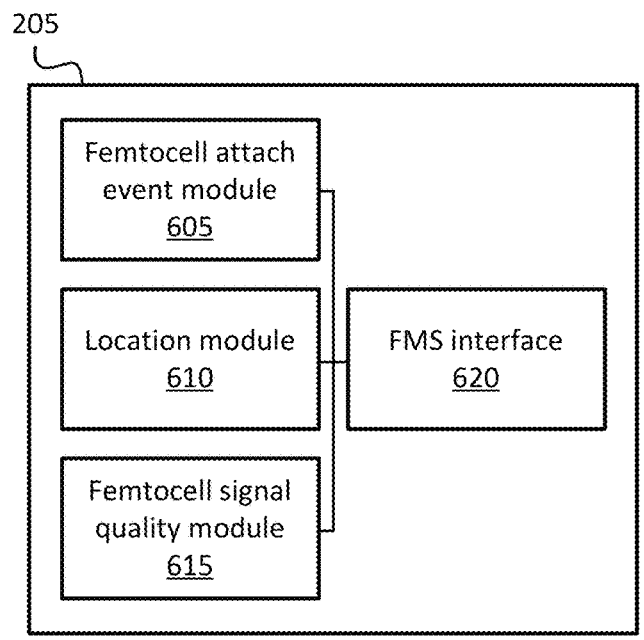
FIG. 6 illustrates example functional components of a user device, in accordance with some implementations.

FIG. 6 illustrates example functional components of user device 205, in accordance with some implementations. As shown, user device 205 may include femtocell attach event module 605, location module 610, femtocell signal quality module 615, and FMS interface 620. In some implementations, user device 205 may include additional, fewer, different, or differently arranged components.

Femtocell attach event module 605 may detect attach events related to femtocells 215. An "attach event," as used herein, may refer to when user device 205 has attached to a particular femtocell 215, when user device 205 has detached from femtocell 215, when user device 205 has been handed over from one femtocell 215 to another femtocell 215, when user device 205 has been handed over from base station 210 to femtocell 215, when user device 205 has been handed over from femtocell 215 to base station 210, when user device 205 has detected the presence of femtocell 215, or the like. Femtocell attach event module 605 may determine an identifier associated with the femtocell(s) associated with the attach event. In some implementations, the identifier, for a particular femtocell, may be a Cell Global Identity ("CGI"), an Evolved CGI ("ECGI"), and/or another unique identifier.

Location module 610 may determine a geographic location associated with user device 205. Location module 610 may, for example, use Global Positioning System ("GPS") techniques, assisted GPS ("A-GPS") techniques, network-based techniques (e.g., by requesting a location from a wireless telecommunications network), and/or one or more other techniques. In some implementations, location module 610 may periodically, continuously, or intermittently monitor the location of user device 205. Location module 610 may, in some implementations, determine a height of user device 205. For example, location module 610 may determine an altitude, a floor of a building in which user device 205 is located, etc. Location module 610 may make use of an altimeter, and/or may use another technique in order to determine the height of user device 205. In some implementations, location module 610 may determine the location of user device 205 at the time that an attach event is detected by femtocell attach event module 605.

Femtocell signal quality module 615 may determine a signal quality between user device 205 and one or more femtocells 215 (e.g., the femtocell(s) 215 associated with an attach event detected by femtocell attach event module 605). The signal "quality" may refer to a signal strength, which may be in terms of signal to interference and noise ratio ("SINR"), signal to noise ratio ("SNR"), or the like. For instance, a relatively low SINR value may indicate a relatively weak signal, while a relatively high SINR value may indicate a relatively strong signal.

In some implementations, signal "quality" may additionally, or alternatively, refer to other measures or indicators of the quality of a signal, such as a Channel Quality Index ("CQI"), reported by user device 205, and/or other quality indicators. As described below, signal quality may be used, in some implementations, to approximate the distance of user device 205 from a particular femtocell 215.

FMS interface 620 may include an implementation of a particular application programming interface ("API"), an IP interface, and/or another type of interface, via which user device 205 may communicate with FMS 225. For example, in some implementations, user device 205 may communicate with FMS 225 via PDN 260. In some such implementations, FMS interface 620 may utilize an IP address (and/or another identifier), associated with FMS 225, in order to communicate with FMS 225. In some implementations, user device 205 may communicate with FMS 225 via the LTE network (e.g., by augmenting or supplementing standard interfaces that are present in current 3GPP standards). Via FMS interface 620, user device 205 may output information regarding attach events (e.g., an ECGI of femtocell 215 associated with the attach event, an identifier associated with user device 205 (e.g., an International Mobile Subscriber Identity ("IMSI") value, an International Mobile Station Equipment Identity ("IMEI"), etc.), a signal quality/strength, a time at which the attach event occurred, a location of user device 205 when the attach event occurred, and/or other information).

Figure 7:
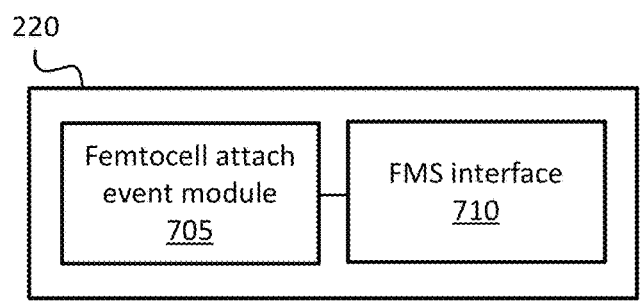
FIG. 7 illustrates example functional components of a femtocell gateway, in accordance with some implementations.

FIG. 7 illustrates example functional components of femtocell gateway 220, in accordance with some implementations. As shown, femtocell gateway 220 may include femtocell attach event module 705 and FMS interface 710. In some implementations, femtocell gateway 220 may include additional, fewer, different, or differently arranged components.

Femtocell attach event module 705 may receive information from one or more femtocells 215 (e.g., femtocells that are connected to femtocell gateway 220), regarding an attach event associated with the one or more femtocells 215. The information may include, for example, an identifier of femtocell 215, an identifier of a particular user device 205 associated with the attach event, a signal quality/strength between femtocell 215 and user device 205, or the like).

FMS interface 710 may include an implementation of an API, an IP interface, and/or another type of interface, via which femtocell gateway 220 may communicate with FMS 225. For example, in some implementations, femtocell gateway 220 may communicate with FMS 225 via PDN 260. In some implementations, femtocell gateway 220 may communicate with FMS 225 via the LTE network (e.g., by augmenting or supplementing standard interfaces that are present in current 3GPP standards). Via FMS interface 710, user device 205 may output information regarding attach events (e.g., as received from one or more femtocells 215, via femtocell attach event module 705).

Figure 8:
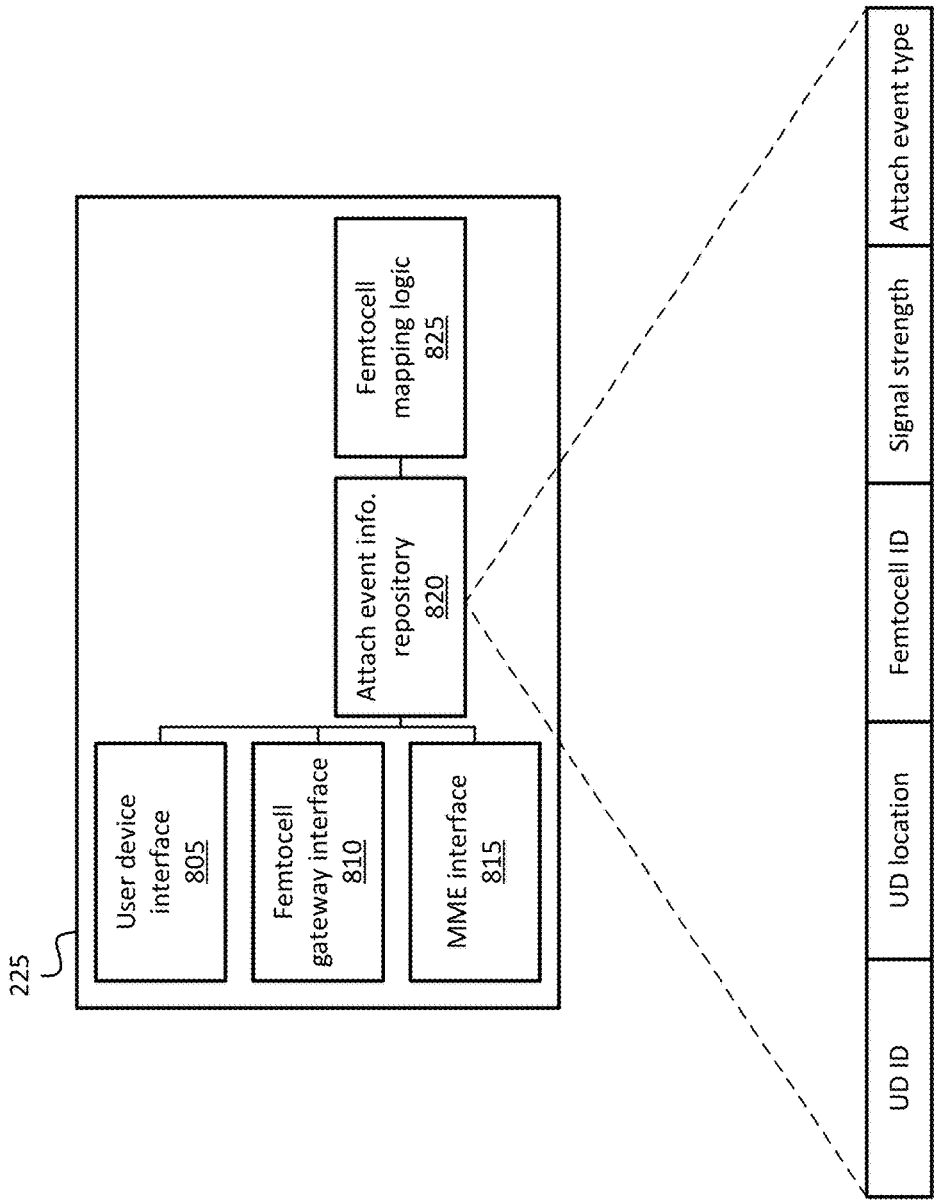
FIG. 8 illustrates example functional components of a femtocell mapping server ("FMS"), in accordance with some implementations.

FIG. 8 illustrates example functional components of FMS 225, in accordance with some implementations. As shown, FMS 225 may include user device interface 805, femtocell gateway interface 810, MME interface 815, attach event information repository 820, and femtocell mapping logic 825. In some implementations, FMS 225 may include additional, fewer, different, or differently arranged components.

User device interface 805, femtocell gateway interface 810, and MME interface 815 may include interfaces, via which FMS 225 communicates with one or more user devices 205, one or more femtocell gateways 220, and MME 240, respectively. User device interface 805, femtocell gateway interface 810, and MME interface 815 may each include an implementation of an API, an IP interface, and/or another type of interface. In some implementations, femtocell gateway interface 810 may communicate with one or more femtocells 215 (e.g., without an intervening femtocell gateway 220).

Attach event information repository 820 may store information regarding attach events (e.g., as received from user devices 205, femtocells 215, and/or femtocell gateways 220). As shown, the information may include a user device identifier ("UD ID"), a user device location, a femtocell identifier, signal quality/strength information, and information regarding the type of attach event. As described above, the user device identifier may include an IMSI value, an IMEI value, and/or another type of identifier that may be used to identify user device 205.

The user device location field may store information regarding user device 205, at the time of (e.g., at the exact same time, or within a particular window of time, such as within one second, within ten seconds, within a minute, etc.) a particular attach event. The location information may, in some implementations, be received from user device 205. Additionally, or alternatively, the location information may be received from MME 240, and/or another source. For example, FMS 225 may request (via MME interface 815) location information from MME 240, MME 240 may push location information to FMS 225, and/or location information may be received from a service or device that tracks the location of user device 205.

The femtocell identifier field may store information regarding one or more femtocells, associated with the attach event. As mentioned above, the femtocell identifier may include a CGI, an ECGI, and/or another type of identifier. As described further below, in some situations, a particular attach event may include the simultaneous detection of the presence of two or more femtocells 215. In these situations, the femtocell identifier field may store multiple identifiers, which respectively correspond to the two or more femtocells 215.

The signal strength field may store signal strength information associated with the attach event. As mentioned above, the signal strength field may include an SNR value, an SINR value, and/or another type of value. While not shown here, attach event information repository may additionally, or alternatively, include other types of information related to signal strength and/or quality, such as CQI values.

The attach event type field may include information regarding the type of the attach event. For instance, this field may store information indicating whether the attach event is an attachment to femtocell 215, a detachment from femtocell 215, a handover from femtocell 215 to another femtocell 215, a handover from base station 210 to femtocell 215, a handover from femtocell 215 to base station 210, and/or a detection of the presence of one or more femtocells 215. As described below, this information may useful in determining spatial relationships of femtocells 215, determining cell edges of femtocells 215, identifying overlapping coverage areas of femtocells 215, etc.

Femtocell mapping logic 825 may identify locations of femtocells 215, based on the information stored by attach event information repository 820. For example, femtocell mapping logic 825 may estimate the location of a particular femtocell 215, based on location information, signal quality/strength information, etc., received from multiple user devices 205 that have attached to femtocell 215. Examples of the determination of the locations of femtocells 215, by femtocell mapping logic 825, are described below in greater detail.

Femtocell mapping logic 825 may generate a map (e.g., a visual map, similar to the example shown in FIG. 1), a list, and/or some other representation that indicates the locations of femtocells 215. In some implementations, femtocell mapping logic 825 may generate multiple maps. The multiple maps may correspond to different regions (e.g., one map may correspond to one building, city, state, country, etc., while another map may correspond to another building, city, state, or country), and/or may have different scales of granularity (e.g., one map may be on a state level, while another map may be on a city level or a building level). In some implementations, the maps may represent height information for femtocells 215 (e.g., the maps may considered to be "three-dimensional" maps). In some implementations, femtocell mapping logic 825 may overlay visual representations of femtocells 215 (e.g., dots or femtocell icons, as shown in FIG. 1) on an existing map (e.g., a map obtained from a provider of maps or map-related services).

In some implementations, femtocell mapping logic 825 may modify an existing map based on retrieved information. For instance, in the situation where a particular femtocell 215 is moved, femtocell mapping logic 825 may begin to receive location information that conflicts with previously received location information that corresponds to femtocell 215. After receiving enough location information to substantiate the inference that femtocell 215 has been moved (e.g., after receiving at least a threshold amount of location information regarding user devices 205 that have attached to, or detected, femtocell 215 in the new location), femtocell mapping logic 825 may modify a previous map to reflect the new location of femtocell 215.

Further, femtocell mapping logic 825 may refine an existing map based on retrieved information. For instance, assume that femtocell mapping logic 825 has identified a location of a particular femtocell 215, with an accuracy of 15 meters (e.g., in a scenario where user devices 205 within a 15 meter radius have provided location information). Further assume that femtocell mapping logic 825 begins to receive location information from user devices 205, corresponding to femtocell 215, within a 5 meter radius. Femtocell mapping logic 825 may determine that the location of femtocell 215 with an accuracy of 5 meters (e.g., a refinement as compared to 15 meters), based on the new location information.

Figure 9:
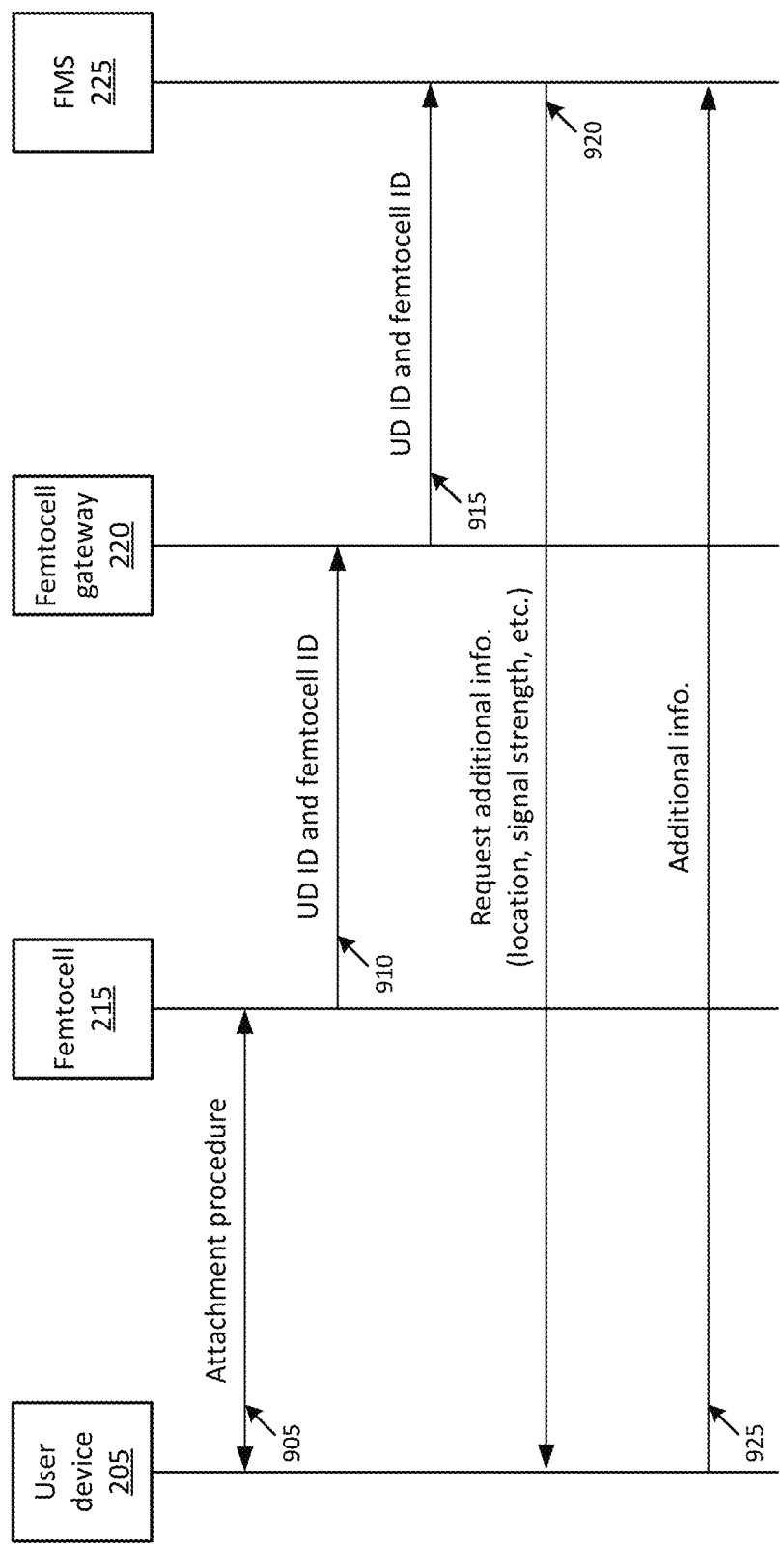
FIG. 9 illustrates an example signal flow, based on which an FMS may generate or modify a map of femtocells.

FIG. 9 illustrates an example signal flow, based on which FMS 225 may generate or modify a map of femtocells. As shown, user device 205 may perform (at 905) an attachment procedure with femtocell 215. For instance, user device 205 may send an attach request to femtocell 215, and femtocell 215 may proceed to allow user device 205 to attach to femtocell 215. While not shown, the attachment procedure may involve one or more other devices, such as femtocell gateway 220 and/or MME 240. As part of the attachment procedure (or after the attachment procedure), femtocell 215 may provide (at 910) a user device identifier (e.g., an IMEI value, an IMSI value, etc.) and a femtocell identifier (e.g., a CGI value, an ECGI value, etc.) to femtocell gateway 220. For example, the user device identifier may correspond to an identifier provided by user device 205, during the attachment procedure (at 905).

Femtocell gateway 220 may forward (at 915) the user device identifier and the femtocell identifier to FMS 225. FMS 225 may request (at 920) additional information from user device 205. For instance, FMS 225 may request a location of user device 205 at the time of the attachment, a signal quality (e.g., signal strength or other measure of quality) between user device 205 and femtocell 215, and/or other information. User device 205 may provide (at 925) the requested information to FMS 225. In some implementations, user device 205 may "push" the information to FMS 225 (e.g., without a request from FMS 225). For instance, user device 205 may push the information based on attaching to femtocell 215, and/or may push the information on a periodic or intermittent basis. Additionally, or alternatively, while not shown in this figure, FMS 225 may request information from one or more other sources. For instance, as mentioned above, FMS 225 may request location information, regarding user device 205, from MME 240 and/or one or more other devices. FMS 225 may use the information, provided by user device 205, femtocell gateway 220, and/or the one or more other devices, in order to determine a location (or an approximate location) of femtocell 215.

Figure 10:
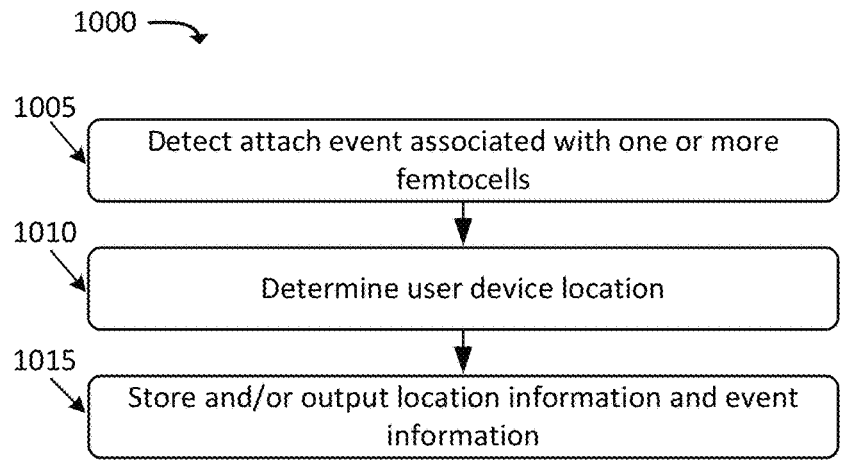
FIG. 10 illustrates an example process, in which a user device may provide information, which may be useful in generating a map of femtocells, to an FMS.

FIG. 10 illustrates an example process 1000, in which user device 205 may provide information, which may be useful in generating a map of femtocells, to FMS 225. As shown, process 1000 may include detecting (at 1005) an attach event associated with one or more femtocells 215. For instance, as described above with respect to femtocell attach event module 605, user device 205 may detect an attachment to, or a detachment from, a particular femtocell 215. Additionally, or alternatively, user device 205 may detect the presence of one or more femtocells 215 (e.g., user device 205 may detect a signal from one or more femtocells 215). In some implementations, as also described above with respect to femtocell signal quality module 615, user device 205 may detect a signal quality between user device 205 and the one or more femtocells 215.

Process 1000 may further include determining (at 1010) a location of user device 205. For instance, as described above with respect to location module 610, user device 205 may determine its location using GPS techniques, A-GPS techniques, network-based techniques, etc.

Process 1000 may also include storing and/or outputting (at 1015) the location information and the attach event information. For example, user device 205 may output information identifying the type of attach event (e.g., attachment, detachment, presence detection, etc.) to FMS 225. Additionally, or alternatively, user device 205 may output location information at the time of the attach event, an identifier associated with user device 205, an identifier associated with the one or more femtocells 215, etc., to FMS 225.

Figure 11:
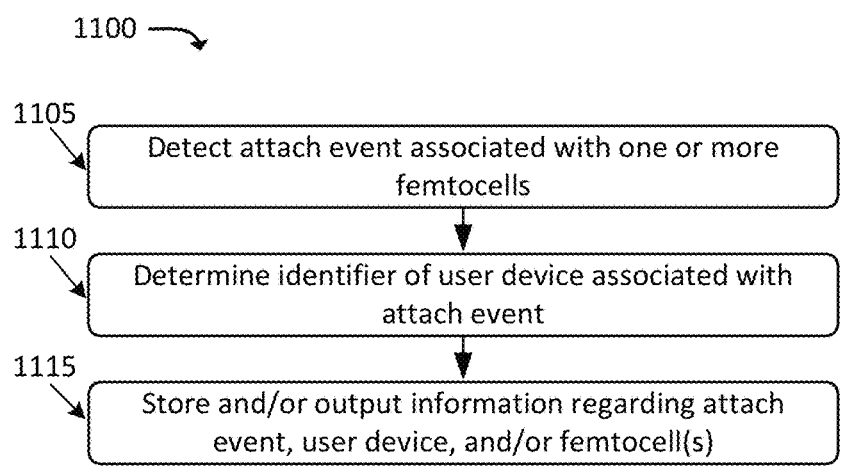
FIG. 11 illustrates an example process, in which a femtocell (and/or a femtocell gateway) may provide information, which may be useful in generating a map of femtocells, to an FMS.

FIG. 11 illustrates an example process 1100, in which femtocell 215 and/or femtocell gateway 220 may provide information, which may be useful in generating a map of femtocells 215, to FMS 225. As shown, process 1100 may include detecting (at 1100) an attach event associated with one or more femtocells 215. For instance, as similarly described above with respect to femtocell attach event module 705, femtocell 215 or femtocell gateway 220 may detect an attachment to, or a detachment from, a particular femtocell 215. Additionally, or alternatively, femtocell gateway 220 may detect the handover of user device 205 from one femtocell 215 to another femtocell 215.

Process 1100 may also include determining (at 1110) an identifier of a particular user device 205, with which the attach event is associated. For example, femtocell 215 and/or femtocell gateway 220 may identify an IMSI, an IMEI, and/or another identifier of user device 205. The user device identifier may be received, for instance, as part of an attachment or handover procedure.

Process 1100 may further include storing and/or outputting (at 1115) information regarding the attach event, user device 205, and/or the one or more femtocells 215. For example, femtocell 215 and/or femtocell gateway 220 may output information identifying the type of attach event (e.g., attachment, detachment, handover, etc.) to FMS 225. Additionally, or alternatively, user device 205 may output an identifier associated with user device 205, an identifier associated with the one or more femtocells 215, etc., to FMS 225.

Figure 12:
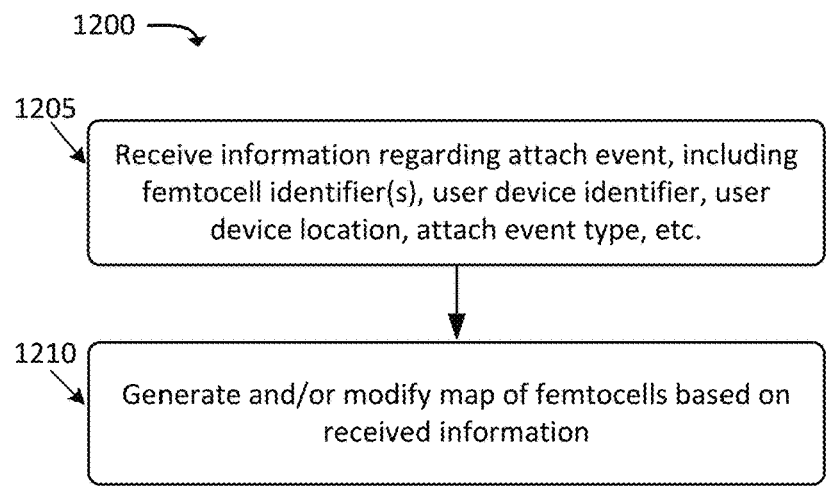
FIG. 12 illustrates an example process, in which an FMS may generate and/or modify a map of femtocells.

FIG. 12 illustrates an example process 1200, in which FMS 225 may generate and/or modify a map of femtocells. As shown, process 1200 may include receiving (at 1210) information regarding an attach event. For example, FMS 225 may receive information identifying one or more femtocells 215 associated with the attach event, an identifier of user device 205 associated with the attach event, a location of user device 205, an attach event type, etc. FMS 225 may receive some or all of the information from user device 205, femtocell 215, femtocell gateway 220, MME 240, and/or from another source.

In some implementations, multiple sources may provide information regarding the same attach event. For instance, user device 205 and femtocell gateway 220 may provide information regarding the same particular attach event. In some implementations, FMS 225 may identify that the information, from the multiple sources, pertains to the same attach event, and may stitch the information together, in lieu of creating multiple data records. For instance, FMS 225 may identify that the information is associated with the same time, the same user device 205, the same femtocell(s) 215, etc.

Process 1200 may also include generating (at 1210) and/or modifying a map of femtocells 215, based on the received information. For instance, as described above, FMS 225 may generate one or more maps (e.g., three-dimensional maps), overlays, and/or other types of representations regarding femtocells 215, based on the information received at 1215.

Figure 13:
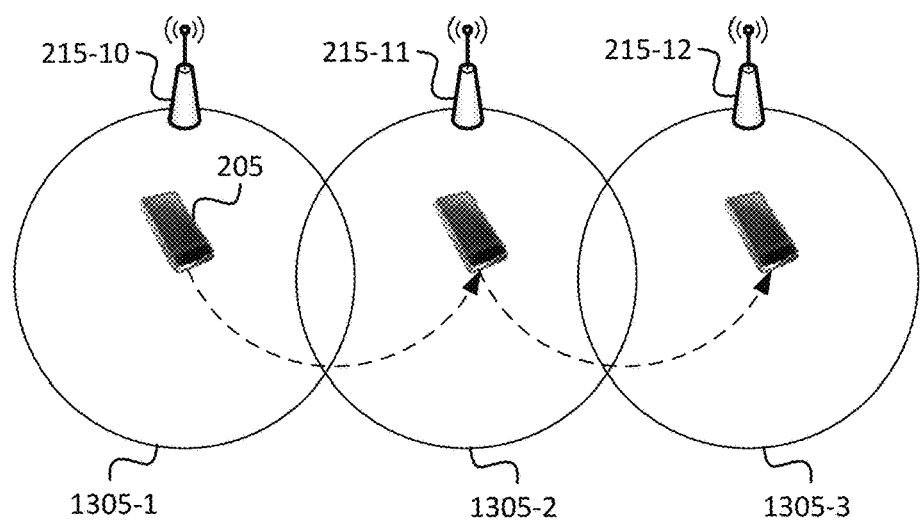
FIGS. 13-15 illustrate examples of situations that may be useful in generating and/or modifying a map of femtocells.
Figure 14:
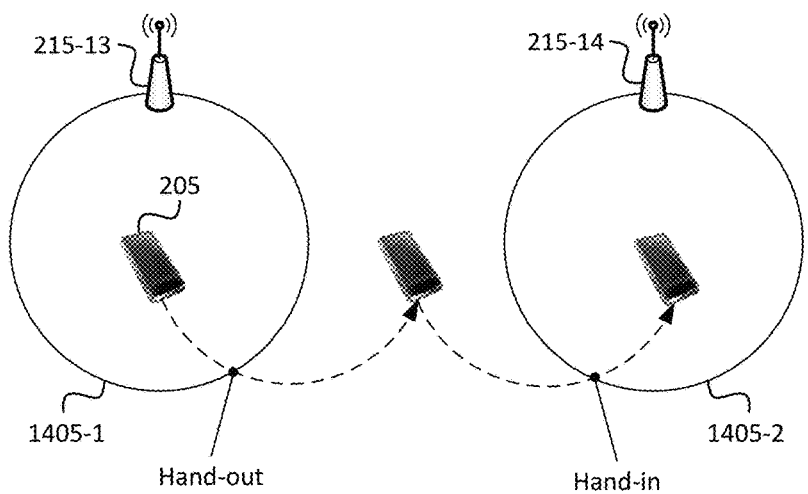
Figure 15:
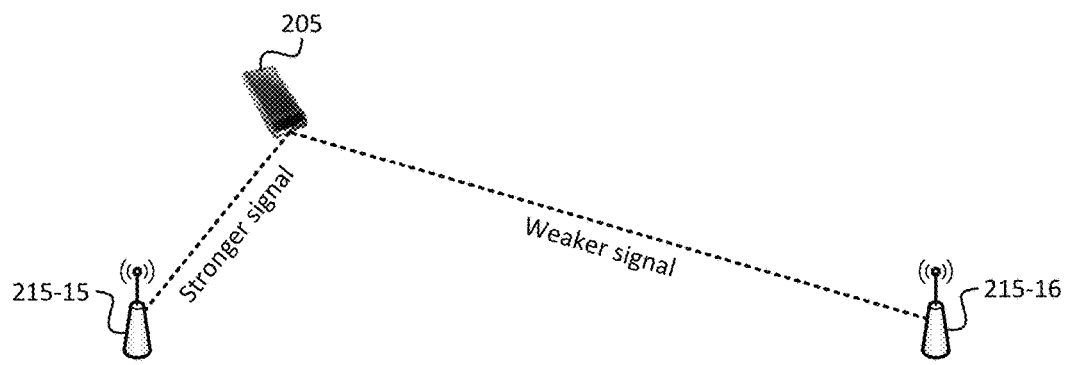

In some implementations, FMS 225 may identify spatial relationships of femtocells 215, based on the received information. FIGS. 13-15 illustrate example situations, in which spatial relationships of femtocells 215 may be identified. For example, as shown in FIG. 13, assume that femtocells 215-10, 215-11, and 215-12 are located in relatively close proximity (e.g., such that corresponding coverage areas 1305-1, 1305-2, and 1305-3 partially overlap). As shown, assume that user device 205 is initially located within coverage area 1305-1 (associated with femtocell 215-10), and is therefore attached to femtocell 215-10. Assume that user device 205 subsequently moves to coverage area 1305-2, and is thus handed over to femtocell 215-11. Based on identifying this handover, it may be inferred (e.g., by FMS 225) that femtocell 215-10 and femtocell 215-11 are located close enough to each other that a handover is possible from femtocell 215-10 to femtocell 215-11, without interruption.

Further, assume that user device 205 subsequently moves to coverage area 1305-3, and is thus handed over to femtocell 215-12. Based on identifying this handover, it may be inferred (e.g., by FMS 225) that femtocell 215-11 and femtocell 215-12 are located close enough to each other that a handover is possible from femtocell 215-11 to femtocell 215-12, without interruption. It may further be inferred that femtocell 215-11 is closer to femtocell 215-10 than femtocell 215-12 is (e.g., that femtocell 215-11 is an intervening femtocell 215 in between femtocell 215-10 and femtocell 215-2).

As shown in FIG. 14, assume that user device 205 is initially located in coverage area 1405-1 (associated with femtocell 215-13). As further shown, assume that user device 205 moves out of coverage area 1405-1, and is thus "handed out" of femtocell 215-13. For instance, user device 205 may move to an exterior of a building in which femtocell 215-13 is located. In some situations, user device 205 may be handed out to base station 210 (e.g., when coverage from base station 210 is available, and/or is better than coverage provided by femtocell 215-13). In some situations, when user device 205 is handed out, user device 205 may "lose service" (e.g., may not be obtain wireless coverage from base station 210 or femtocell 215).

As further shown, user device 205 may subsequently move in to coverage area 1405-2 (e.g., may be "handed in" to femtocell 215-14). Based on the fact that user device 205 was handed out of coverage area 1405-1 without being handed over to another femtocell 215, it may be inferred that femtocell 215-13 is not relatively close to another femtocell 215 (e.g., to femtocell 215-14). This inference may be made, for instance, because coverage area 1405-1, associated with femtocell 215-13, may not overlap with the coverage area of another femtocell 215 (e.g., with coverage area 1405-2).

FIG. 15 illustrates an example of how signal strength may be used to determine a spatial relationship of femtocells 215-15 and 215-16. As shown, assume that user device 205 concurrently detects the presence of femtocells 215-15 and 215-16. For instance, user device 205 may be attached to one of femtocells 215-15 or 215-16, and/or may not be attached to either. Further assume that user device 205 detects a stronger signal strength (e.g., a higher SNR or SINR) from femtocell 215-15 than from femtocell 215-16. It may thus be inferred that user device 205 is closer to femtocell 215-15 than to femtocell 215-16, based on the differing signal strengths. As discussed above, FMS 225 may receive location information for user device 205, as well as the signal strength information. FMS 225 may determine that femtocell 215-15 is closer to the received location than femtocell 215-16. FMS 225 may also determine that femtocell 215-15 and femtocell 215-16 are close enough that user device 205 can concurrently detect both femtocell 215-15 and femtocell 215-16.

FIGS. 13-15 are provided as examples of how location information, attach event type information, and signal strength information can be used to generate or modify a map of femtocells 215. In practice, some or all of these types of information (in conjunction with one or more other types of information) may be used to generate or modify a map of femtocells 215.

Figure 16:
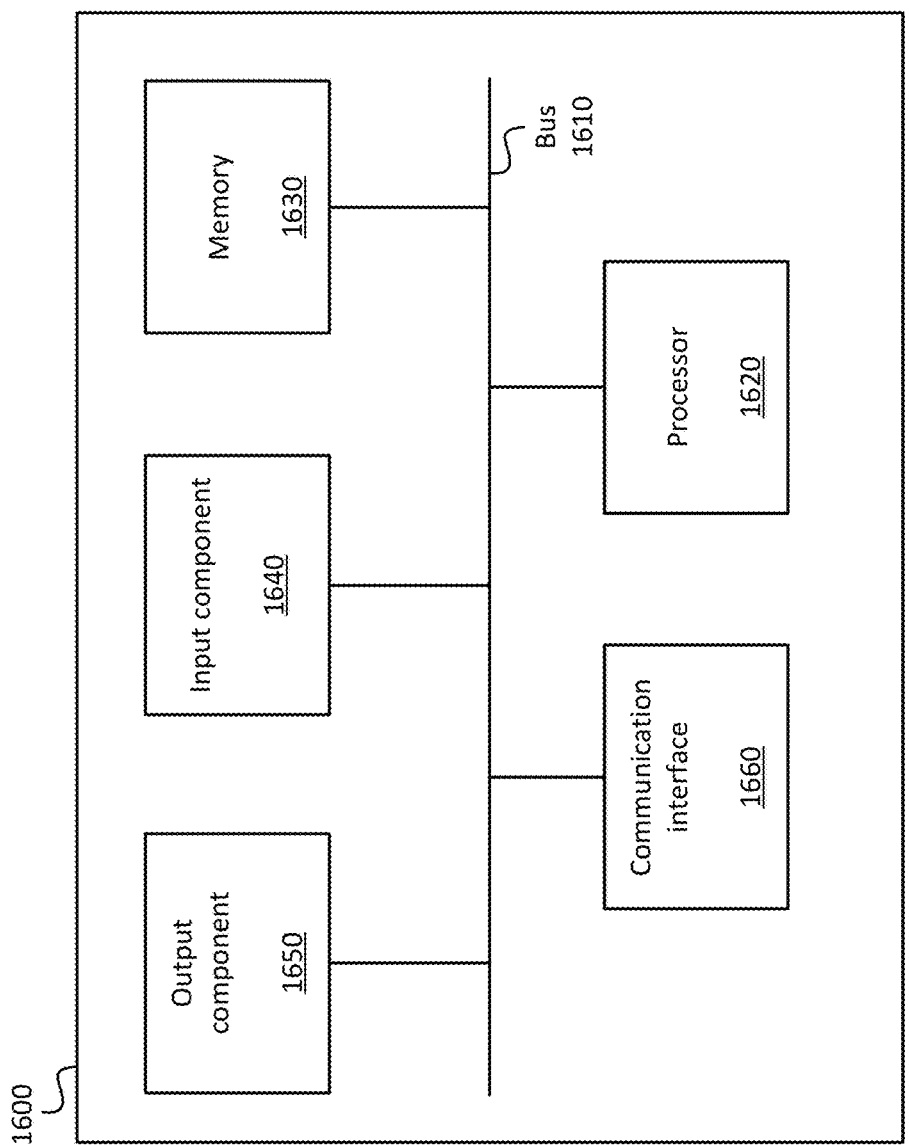
FIG. 16 illustrates example components of a device, in accordance with some implementations described herein.

FIG. 16 is a diagram of example components of device 1600. One or more of the devices described above may include one or more devices 1600. Device 1600 may include bus 1610, processor 1620, memory 1630, input component 1640, output component 1650, and communication interface 1660. In another implementation, device 1600 may include additional, fewer, different, or differently arranged components.

Bus 1610 may include one or more communication paths that permit communication among the components of device 1600. Processor 1620 may include a processor, microprocessor, or processing logic that may interpret and execute instructions. Memory 1630 may include any type of dynamic storage device that may store information and instructions for execution by processor 1620, and/or any type of non-volatile storage device that may store information for use by processor 1620.

Input component 1640 may include a mechanism that permits an operator to input information to device 1600, such as a keyboard, a keypad, a button, a switch, etc. Output component 1650 may include a mechanism that outputs information to the operator, such as a display, a speaker, one or more light emitting diodes ("LEDs"), etc.

Communication interface 1660 may include any transceiver-like mechanism that enables device 1600 to communicate with other devices and/or systems. For example, communication interface 1660 may include an Ethernet interface, an optical interface, a coaxial interface, or the like. Communication interface 1660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1600 may include more than one communication interface 1660. For instance, device 1600 may include an optical interface and an Ethernet interface.

Device 1600 may perform certain operations relating to one or more processes described above. Device 1600 may perform these operations in response to processor 1620 executing software instructions stored in a computer-readable medium, such as memory 1630. A computer-readable medium may be defined as a non-transitory memory device. A memory device may include space within a single physical memory device or spread across multiple physical memory devices. The software instructions may be read into memory 1630 from another computer-readable medium or from another device. The software instructions stored in memory 1630 may cause processor 1620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 9-12, the order of the blocks and/or signals may be modified in other implementations. Further, non-dependent blocks and/or signals may be performed in parallel. Additionally, while processes 1000-1200 have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms), As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used, No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A femtocell mapping device, comprising:
   a memory device storing a set of processor-executable instructions;
   interface hardware configured to communicate with one or more other devices, the one or more other devices including at least one of:
      a user device,
      a plurality of femtocells, or
      a femtocell gateway that is communicatively coupled to the plurality of femtocells; and
   a processor configured to execute the processor-executable instructions, wherein executing the processor-executable instructions causes the femtocell mapping device to:
      receive an indication, from the user device, the plurality of femtocells, or the femtocell gateway, via the interface hardware, the indication including information indicating that the user device has concurrently detected a presence of a first femtocell and a second femtocell, of the plurality of femtocells;
      receive, within a predetermined window of time:
         height information regarding the user device, the height information indicating at least one of:
            an altitude of the user device, or
            a floor of a building on which the user device is located,
         first signal strength information regarding a first signal strength between the user device and the first femtocell, that was obtained by the user device while the user device was concurrently in the presence of the first and second femtocells, and
         second signal strength information regarding a second signal strength between the user device and the second femtocell, that was obtained by the user device while the user device was concurrently in the presence of the first and second femtocells;
      determine a difference between the first signal strength and the second signal strength that were received during the predetermined window of time;
      determine a spatial relationship between the first and second femtocells based on the difference between the first and second signal strengths, that were obtained by the user device while the user device was concurrently in the presence of the first and second femtocells;
      approximate a first distance between the user device and the first femtocell based on the first signal strength;
      approximate a second distance between the user device and the second femtocell based on the second signal strength;
      determine a height of the first femtocell, based on:
         the approximated first distance between the user device and the first femtocell, and
         the height information regarding the user device; and
      determine a height of the second femtocell, based on:
         the approximated second distance between the user device and the second femtocell, and
         the height information regarding the user device.

2. The femtocell mapping device of claim 1, wherein the indication is received from the user device based on at least one of:
   the user device attaching to the first femtocell,
   the user device detaching from the first femtocell,
   the user device being handed to the first femtocell from the second femtocell,
   the user device being handed from the first femtocell to the second femtocell, or
   the user device concurrently detecting that the first femtocell and the second femtocell are present.

3. The femtocell mapping device of claim 1, wherein the first signal strength information or the second signal strength information includes at least one of:
   a signal to noise ratio ("SNR"),
   a signal to interference plus noise ratio ("SINR"), or
   a channel quality index ("CQI").

4. The femtocell mapping device of claim 1, wherein the processor-executable instructions further cause the femtocell mapping device to:
   determine an area in which the first femtocell is located, wherein a size of the area is determined based on the first signal strength between the first femtocell and the user device.

5. The femtocell mapping device of claim 4, wherein executing the processor-executable instructions further causes the femtocell mapping device to generate a visual indication, on a map, that corresponds to the determined area associated with the first femtocell, wherein the map represents the location of the first femtocell in three dimensions, including the determined height of the first femtocell.

6. The femtocell mapping device of claim 1, wherein the processor-executable instructions further cause the femtocell mapping device to:
   receive an indication that the user device has been handed over from the first femtocell to the second femtocell; and
   determine that a coverage area of the first femtocell overlaps a coverage area of the second femtocell, based on the indication that the user device was handed over from the first femtocell to the second femtocell.

7. The femtocell mapping device of claim 1, wherein the first and second femtocells provide wireless coverage on behalf of a wireless telecommunications network, the wireless coverage being provided on a smaller scale than is provided by a base station of the wireless telecommunications network.

8. A method, comprising:
receiving, by a computing device and via interface hardware associated with the computing device, an indication that a user device has concurrently detected a presence of a first femtocell and a second femtocell;
receiving, during a predetermined window of time:
   height information indicating a height of the user device,
   first signal strength information regarding a first signal strength between the user device and the first femtocell, that was obtained by the user device while the user device has detected that the first and second femtocells are concurrently present, and
   second signal strength information regarding a second signal strength between the user device and the second femtocell, that was obtained by the user device while the user device has detected that the first and second femtocells are concurrently present;
approximating a first distance between the user device and the first femtocell based on the first signal strength;
approximating a second distance between the user device and the second femtocell based on the second signal strength;
determining a height of the first femtocell, based on:
   the approximated first distance between the user device and the first femtocell, and
   the height information regarding the user device; and
determining a height of the second femtocell, based on:
   the approximated distance between the user device and the second femtocell, and
   the height information regarding the user device.

9. The method of claim 8, wherein the indication is received from the user device based on at least one of:
the user device attaching to the first femtocell,
the user device detaching from the first femtocell,
the user device being handed to the first femtocell from the second femtocell,
the user device being handed from the first femtocell to the second femtocell, or
the user device detecting that the first femtocell and the second femtocell are concurrently present.

10. The method of claim 8, further comprising:
determining an area in which the first femtocell is located, wherein a size of the area is determined based on the first signal strength information.

11. The method of claim 10, further comprising generating a visual indication, on a three-dimensional map, that corresponds to the determined area and height associated with the first femtocell.

12. The method of claim 8, further comprising:
receiving an indication that the user has been handed over from the first femtocell to the second femtocell; and
determining that a coverage area of the first femtocell overlaps a coverage area of the second femtocell, based on the indication that the user device was handed over from the first femtocell to the second femtocell.

13. The method of claim 8, further comprising:
determining a location of the user device; and
determining a location of the first femtocell based on:
   the location associated with the user device, and
   the first signal strength information.

14. The method of claim 13, wherein determining the location of the user device includes at least one of:
requesting the location from a mobility management entity ("MME"), or
requesting the location from the user device.

15. A user device, comprising:
a memory device storing a set of processor-executable instructions;
interface hardware configured to communicate with one or more other devices; and
a processor configured to execute the processor-executable instructions, wherein executing the processor-executable instructions causes the user device to:
   concurrently detect, via the interface hardware, a presence of a first femtocell and a second femtocell;
   while the user device has detected the concurrent presence of the first and second femtocells, determine:
      a height of the user device,
      a first signal strength between the user device and the first femtocell, and
      a second signal strength between the user device and the second femtocell; and
   output, via the interface hardware and to a femtocell mapping device, information regarding the determined height, first signal strength, and second signal strength, wherein the femtocell mapping device uses the information regarding the determined height, first signal strength, and second signal strength to:
      approximate a first distance between the user device and the first femtocell based on the first signal strength;
      approximate a second distance between the user device and the second femtocell based on the second signal strength;
      determine a height of the first femtocell based on:
         the approximated first distance between the user device and the first femtocell, and
         the height information regarding the user device;
      determine a height of the second femtocell, based on:
         the approximated second distance between the user device and the second femtocell, and
         the height information regarding the user device.

16. The user device of claim 15, wherein outputting the information, regarding the determined first and second signal strengths, to the femtocell mapping device, includes:
pushing the information, regarding the determined first and second signal strengths, independently of whether a request was received from the femtocell mapping device.

17. The user device of claim 15, wherein the first signal strength or the second signal strength is based on at least one of:
a signal to noise ratio ("SNR"),
a signal to interference plus noise ratio ("SINR"), or
a channel quality index ("CQI").

18. The user device of claim 15, wherein executing the processor-executable instructions further causes the user device to:
attach to the first femtocell;
after attaching to the first femtocell, participate in a handover process in which the user device is handed over from the first femtocell to the second femtocell; and
output an indication to the femtocell mapping device, indicating that the user device was handed over from the first femtocell to the second femtocell,
wherein the femtocell mapping device determines that a coverage area of the first femtocell overlaps a coverage area of the second femtocell based on the indication that the user device was handed over from the first femtocell to the second femtocell.

19. The user device of claim 15, wherein executing the processor-executable instructions further causes the user device to:
- attach to the first femtocell;
- after attaching to the first femtocell, participate in a handover process in which the user device is handed over from the first femtocell to a base station of a wireless telecommunications network; and
- output an indication to the femtocell mapping device, indicating that the user device was handed over from the first femtocell to the base station,
  - wherein the femtocell mapping device determines that a coverage area of the first femtocell does not overlap a coverage area of a third femtocell based on the indication that the user device was handed over from the first femtocell to the base station.

20. The user device of claim 15, wherein the information regarding the first signal strength further facilitates the femtocell mapping device determining a size of a coverage area associated with the first femtocell.

* * * * *